United States Patent
Wilkinson et al.

(10) Patent No.: US 8,006,011 B2
(45) Date of Patent: Aug. 23, 2011

(54) INFINIBAND BOOT BRIDGE WITH FIBRE CHANNEL TARGET

(75) Inventors: Keith Iain Wilkinson, Fremont, CA (US); Tracy Edmonds, Morgan Hill, CA (US); Shrikant Jay Vaidya, Rancho Santa Margarita, CA (US)

(73) Assignee: Cisco Technology, Inc., San Jose, CA (US)

( * ) Notice: Subject to any disclaimer, the term of this patent is extended or adjusted under 35 U.S.C. 154(b) by 182 days.

(21) Appl. No.: 11/549,529

(22) Filed: Oct. 13, 2006

(65) Prior Publication Data

US 2007/0204103 A1 Aug. 30, 2007

Related U.S. Application Data (60) Provisional application No. 60/765,902, filed on Feb. 7, 2006.

(51) Int. Cl.
*G06F 13/12* (2006.01)
*G06F 15/16* (2006.01)
*H04L 12/403* (2006.01)

(52) U.S. Cl. ............... 710/74; 370/457; 709/249

(58) Field of Classification Search .......... 710/8, 74; 711/111, 114; 370/457; 709/249
See application file for complete search history.

(56) References Cited

U.S. PATENT DOCUMENTS

| | | | |
|---|---|---|---|
| 6,400,730 B1 * | 6/2002 | Latif et al. ................ 370/466 |
| 6,754,785 B2 * | 6/2004 | Chow et al. ................ 711/147 |
| 6,895,512 B1 * | 5/2005 | Calbucci ........................ 726/3 |
| 6,904,477 B2 * | 6/2005 | Padmanabhan et al. ...... 710/74 |
| 7,000,015 B2 * | 2/2006 | Moore et al. ................ 709/224 |
| 7,206,314 B2 * | 4/2007 | Liao et al. ................... 370/401 |
| 7,590,141 B1 * | 9/2009 | Barry .......................... 370/457 |
| 2002/0069334 A1 * | 6/2002 | Hsia et al. ................... 711/147 |
| 2002/0165978 A1 * | 11/2002 | Chui ............................. 709/238 |
| 2003/0126242 A1 * | 7/2003 | Chang ......................... 709/222 |
| 2004/0024911 A1 * | 2/2004 | Chung et al. ............... 709/249 |

OTHER PUBLICATIONS

InfiniBand Architecture Specification, 2002, InfiniBand Trade Association, vol. 1.*

* cited by examiner

*Primary Examiner* — Henry W Tsai
*Assistant Examiner* — Hyun Nam
(74) *Attorney, Agent, or Firm* — Schwegman, Lundberg & Woessner, P.A.

(57) ABSTRACT

A data storage system comprises an InfiniBand port, a fibre channel port, and a controller. The InfiniBand port is operable to connect the data storage system to a computer, and the fibre channel port is operable to connect the data storage system to one or more fibre channel storage devices. The controller is operable to receive an InfiniBand boot request from a computer system via the InfiniBand Port, and to connect the computer system to the one or more fibre channel storage devices via the fiber channel port such that the controller is operable to map an InfiniBand boot request from the computer system to a fibre channel target.

12 Claims, 6 Drawing Sheets

INFINIBAND BOOT BRIDGE WITH FIBRE CHANNEL TARGET

RELATED APPLICATIONS

This patent application claims the benefit of priority, under 35 U.S.C. Section 119(e), to U.S. Provisional Patent Application Ser. No. 60/765,902, filed on Feb. 7, 2006, the entire content of which is incorporated herein by reference.

FIELD

The invention relates generally to computer data interfaces, and more specifically to booting a computer system via an InfiniBand connection through a bridge to a fibre channel boot target.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Computer systems typically include a number of common components, including processors, memory, and hard disk storage. A computer bus couples the various components, often using specific interfaces between the bus and the various computer devices attached to the device. For example, memory and video adapters are often on their own special high-speed buses designed for the particular demands of the attached devices, and hard disk drives are often attached via a storage adapter such as a SATA (serial ATA) or SCSI (small computer system interface) interface coupled between the main computer bus and the storage devices. The interface adapter is designed to communicate with and control a specific type of attached device, such as a SATA hard disk drive or CD-ROM drive, or a SCSI hard disk drive or SCSI tape drive.

In more sophisticated computer systems, hard disk storage interfaces such as SATA are replaced with multiple channels of SCSI adapters, or more sophisticated interfaces such as Fibre Channel or InfiniBand. These interfaces are both high-speed interfaces designed to enable attachment of a number of high-speed peripheral devices such as hard disk drives to a single interface channel, and to enable sophisticated configurations of storage devices such as redundant arrays of independent disk drives (RAID) and storage area networks. Some interface technologies also enable connection of devices other than storage devices, including InfiniBand's support for network interfaces and processor clusters external to a particular server.

But, with a variety of formats available, connection between peripheral devices supporting different standards can be an important factor in achieving the desired configuration or performance of a system. One common solution to such problems is to simply configure a computer system having both types of adapters, so that it can access both types of devices. This involves expense of adding hardware and increases the complexity of the system, and may consume resources such as computer bus slots or processor time that are in high demand. Another solution is to build a special-purpose computer system having interfaces for both systems, designed to act only as a "bridge" between the two interfaces. Such systems typically receive information in one interface format in an interface adapter and decode the data, at which point it can be transferred in the bridge to an interface adapter supporting another interface format for encoding and transmission.

But, such bridge systems are often significantly slower at translating and passing on data than the native speed of either of the interface formats involved, and so are typically a bottleneck in such a bridge system. Further, certain operations such as booting a computer from a specific boot volume across the bridge containing an operating system are often not supported. The performance of a bridge system is therefore a concern to those incorporating a bridge into a computer system.

DETAILED DESCRIPTION

In the following detailed description of example embodiments of the invention, reference is made to specific example embodiments of the invention by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit other embodiments of the invention or the invention as a whole, and any reference to the invention, its elements, operation, and application do not limit the invention as a whole but serve only to define these example embodiments. The following detailed description does not, therefore, limit the scope of the invention, which is defined only by the appended claims.

In one example embodiment, the invention provides a bridge between InfiniBand and fibre channel format electronic or optical network technologies. The bridge comprises InfiniBand and fibre channel interfaces, and a controller operable to allow a computer system having an InfiniBand interface to boot from a fibre channel device. This is achieved in one example by mapping an InfiniBand global user identifier (GUID) initiator to more than one fibre channel targets, so that if a first target is unavailable the computer system can boot from a second or subsequent target.

Fibre channel is a network technology used primarily for storage networking, and is a recognized ANSI standard network protocol and technology. It includes point-to-point, arbitrated loop, and switched fabric network structures, and is typically carried over either optical fiber or twisted pair copper wire. Fibre channel is a serial communications format, meaning that data is transmitted sequentially rather than in parallel over several physical connections at the same time. Fibre channel includes a physical layer description, defining the physical connections and signaling or coding format used to exchange data, as well as layers supporting advanced function configuration and applications or protocols such as SCSI (small computer system interface), IP (Internet Protocol), the IEEE 802.2 networking protocol, and interprocessor signals in a multiprocessor network.

InfiniBand is also a serial computer communications technology, using high-speed copper wire or optical connection between communicating elements in a computer system or network to exchange data. InfiniBand is commonly used for interprocessor communications in a multiprocessor computing system, and for connection to peripheral devices such as network adapters and storage devices. InfiniBand is promoted as a replacement for the typical shared bus in a computer system due to its switched nature, allowing multiple devices to use the switched network at the same time InfiniBand includes among its functions a type of remote memory access known as RDMA, or remote direct memory access, enabling one InfiniBand device to directly read or write memory of another InfiniBand device. This feature has become a part of other standards used with Infiniband, such as SCSI RDMA protocol, in which SCSI commands and data transfers are communicated via InfiniBand RDMA exchanges. InfiniBand shall, for purposes of this application, include any such industry standard, channel-based, switched fabric, interconnect architecture known or referred to in the industry as "Infini-Band", including architectures designed to be interoperable with an InfiniBand standard and all such variations of the standard as published by the InfiniBand trade association (www.infinibandta.com) as of the date of filing of this application, and their equivalents. Similarly, SCSI RDMA shall, for purposes of this application, include any SCSI RDMA standard known or referred to in the industry as SCSI RDMA at the time of filing, including architectures designed to be interoperable with SCSI RDMA standard and all such variations of the standard, and their equivalents.

Booting to a fibre channel device over an InfiniBand interface includes in one embodiment converting the InfiniBand boot device request data to a fibre channel format, and converting the fibre channel format data from the boot disk into InfiniBand format data so that it can be received in the booting system's InfiniBand interface. It also comprises mapping an InfiniBand boot device request to a particular fibre channel volume, or in a further embodiment mapping an InfiniBand boot device request to two or more targets such that if a first target is unavailable the system is able to boot from a second or subsequent target.

Figure 1:
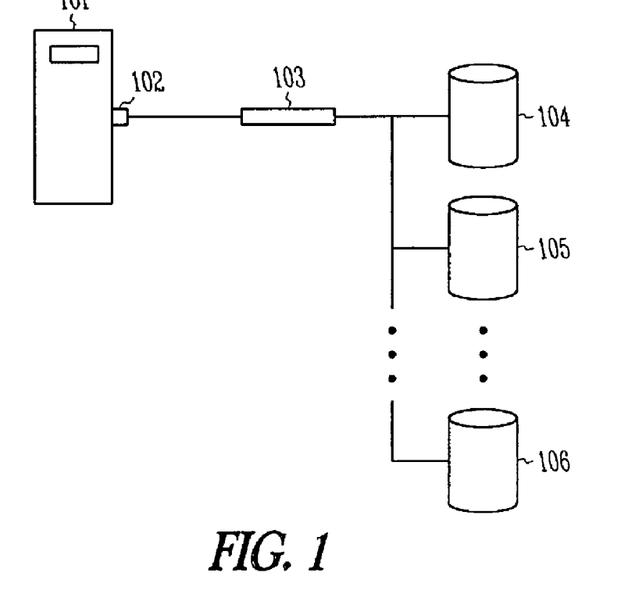
FIG. 1 shows a block diagram of a computer system having an InfiniBand interface coupled via a controller to a fibre channel disk, consistent with an example embodiment of the invention.

FIG. 1 shows an example system having an InfiniBand computer system interface and fibre channel boot target disks, consistent with an example embodiment of the invention. A computer system 101 includes an InfiniBand interface 102, which is coupled to a controller 103. The controller 103 is in some embodiments located within the computer system 101, while in other embodiments is a separate device or is part of another device such as a switch, a router, or a storage controller. The controller 103 is also coupled to a plurality of fibre channel devices 104-106, such that the computer system 101 can communicate with the fibre channel disks 104-106 via its InfiniBand interface 102 and the controller 103.

The controller 103 serves to act as a bridge between the InfiniBand interface 102 and the fibre channel devices 104-106, performing protocol translation so that the fibre channel devices can work in an InfiniBand computer system. In one specific embodiment, the system 101 is able to boot from the fibre channel disks via its InfiniBand interface 102. The system 101 sends an InfiniBand initiator including a global user identifier (GUID) to a target device defined by a service name. The initiator and service name are received in the controller 103, which looks up a corresponding fibre channel target and logical unit number (LUN). A target in fibre channel can include multiple disks, such as a disk array, and the LUN defines the actual disk within the target.

In an example embodiment, the InfiniBand interface 102 uses an initiator to log onto the controller 103 and identify a GUID to the controller. The GUID includes a world wide port name, which is mapped in the controller 103 to the target device and LUN of the fibre channel boot device 104. Data is conveyed from the controller 103 to the InfiniBand interface 102 of computer system 101 via the SCSI RDMA protocol, which allows remote direct memory access (RDMA) transfers of small computer system interface (SCSI) data to the memory of coupled InfiniBand devices.

In a further example, the world wide port name (WWPN) is a specific well-known name that is used to identify a particular service. Recognition of this well-known identifier in the controller 103 results in mapping a particular target and LUN to the InfiniBand boot request, such as mapping one or more of a group of disks. The boot target and LUN mapped through the controller are in some embodiments not simply a single target and LUN, but comprise two or more logical unit numbers such that if a first LUN is unavailable the boot device mapping attempts to map to a second or subsequent LUN. In a further embodiment, the LUNs are in different targets, such as in different disk arrays, such that if a single array controller fails or loses power a boot device from another target can be used.

Figure 2:
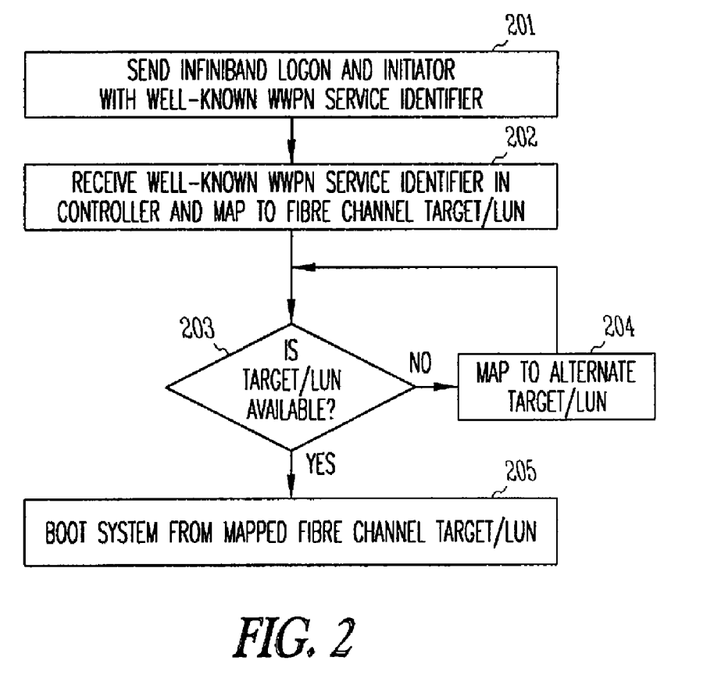
FIG. 2 is a flowchart of a method of booting a computer system having an InfiniBand interface from a fibre channel boot volume mapped via a controller, consistent with an example embodiment of the invention.

This enables a computer system with an InfiniBand adapter to boot from a fibre channel device that is unknown to the booting computer system, and permits the use of multiple or redundant boot volumes to ensure high availability. FIG. 2 is a flowchart, illustrating an example of booting a computer system having an InfiniBand adapter from one of a number of available boot devices.

At 201, the computer system initiates an InfiniBand link with the controller. The Infiniband link includes logging in, and presenting a world wide port name identifying an InfiniBand device which the computer system intends to communicate. In an example embodiment, the world wide port name is a specific well-known port name identifying a boot service, supported in the controller. The controller receives the well-known port name and recognizes it at 202, causing the controller to map the InfiniBand request to a particular fibre channel target and logical unit number-identified boot volume. If the boot volume is determined to be powered on, operational, properly connected and configured, and otherwise available at 203, the computer system proceeds to boot from the boot volume identified by the target/LUN at 205. If the identified target/LUN boot volume is not available for any reason at 203, an alternate target/LUN is identified at 204. The alternate boot volume is then used to boot the computer system if it is available, or yet another target/LUN is tried if the alternate boot volume is unavailable.

If many boot volumes are unavailable, the controller will handle assigning a boot volume to the well-known world wide port name request in a variety of ways, such as retrying each configured boot volume until one becomes available, or returning an error message to the booting computer system.

Thus, in an example embodiment, a computer system having an InfiniBand connection can boot from a fibre channel device, and a request for a well-known world wide port name can be identified and mapped to one of a number of target/LUN boot volumes depending on availability of the configured boot volumes. Although specific embodiments have been illustrated and described herein, it will be appreciated by those of ordinary skill in the art that any arrangement that achieve the same purpose, structure, or function may be substituted for the specific embodiments shown.

The examples described herein may be practiced in some embodiments in a virtual server environment, such as where multiple servers may exist in a single computer system or where resources from multiple computer systems may be used to form a virtual server. One example of such a virtual server architecture is shown in FIG. 3.

Figure 3:
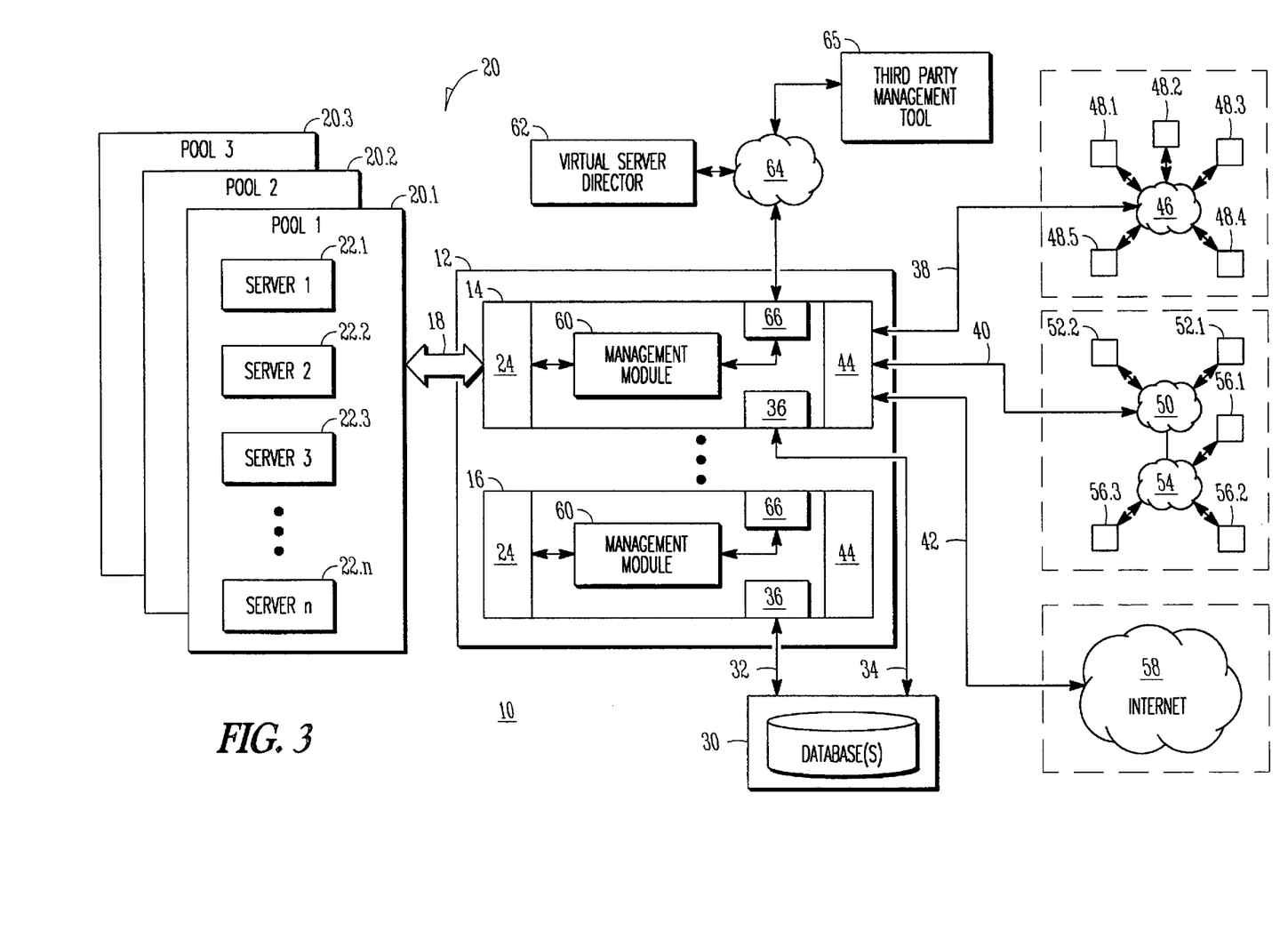
FIG. 3 shows a virtual server system architecture consistent with an example embodiment of the invention.

Referring to FIG. 3, reference 10 generally indicates a virtual server system in which the methodologies described above may be deployed. In an example embodiment, as the server personality is separated from the physical structure, it may be possible to customize virtual servers on-demand out of industry standard components.

The system 10 is shown, by way of example, to include a switch group 12 including one or more switches 14, 16. The switch group 12 is connected, for example, via an Infiniband link 18 to one or more server pools 20. By way of example, three server pools 20.1-20.3 are shown in FIG. 3 but it will be appreciated that any number of server pools may be provided and that each server pool may have a different number of server blades, racks, or the like. Each server pool 20.1-20.3 is shown to include a plurality of servers 22.1-22.n linked via one or more Infiniband links 18 to the switch group 12. Accordingly, when the link 18 is an Infiniband link, each switch 14 may include an Infiniband interface 24 to interface the server pools 20.1-20.3 to the switch group 12. The Infiniband architecture or link may define a high speed network for interconnecting processing nodes and I/O nodes. In an Infiniband network, processing nodes and I/O nodes are connected to the fabric by Host Channel Adapters (HCAs) and Target Channel Adapters (TCAs). It will however be appreciated that in addition to, or instead of, the Infiniband link 18 other links may be provided.

Figure 4:
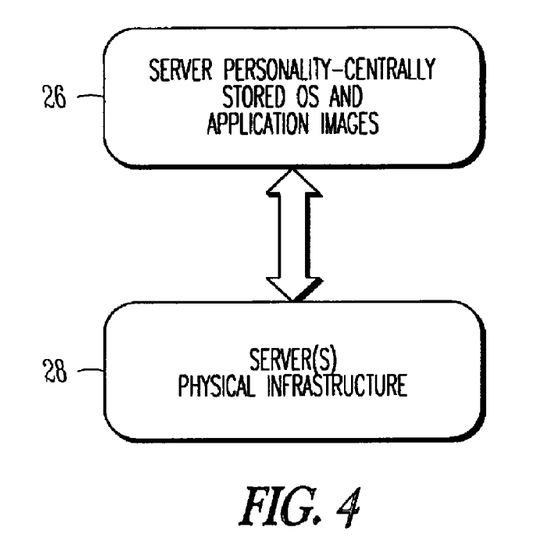
FIG. 4 shows separation of physical infrastructure from the server personality of a server of the system of FIG. 3.
Figure 9:
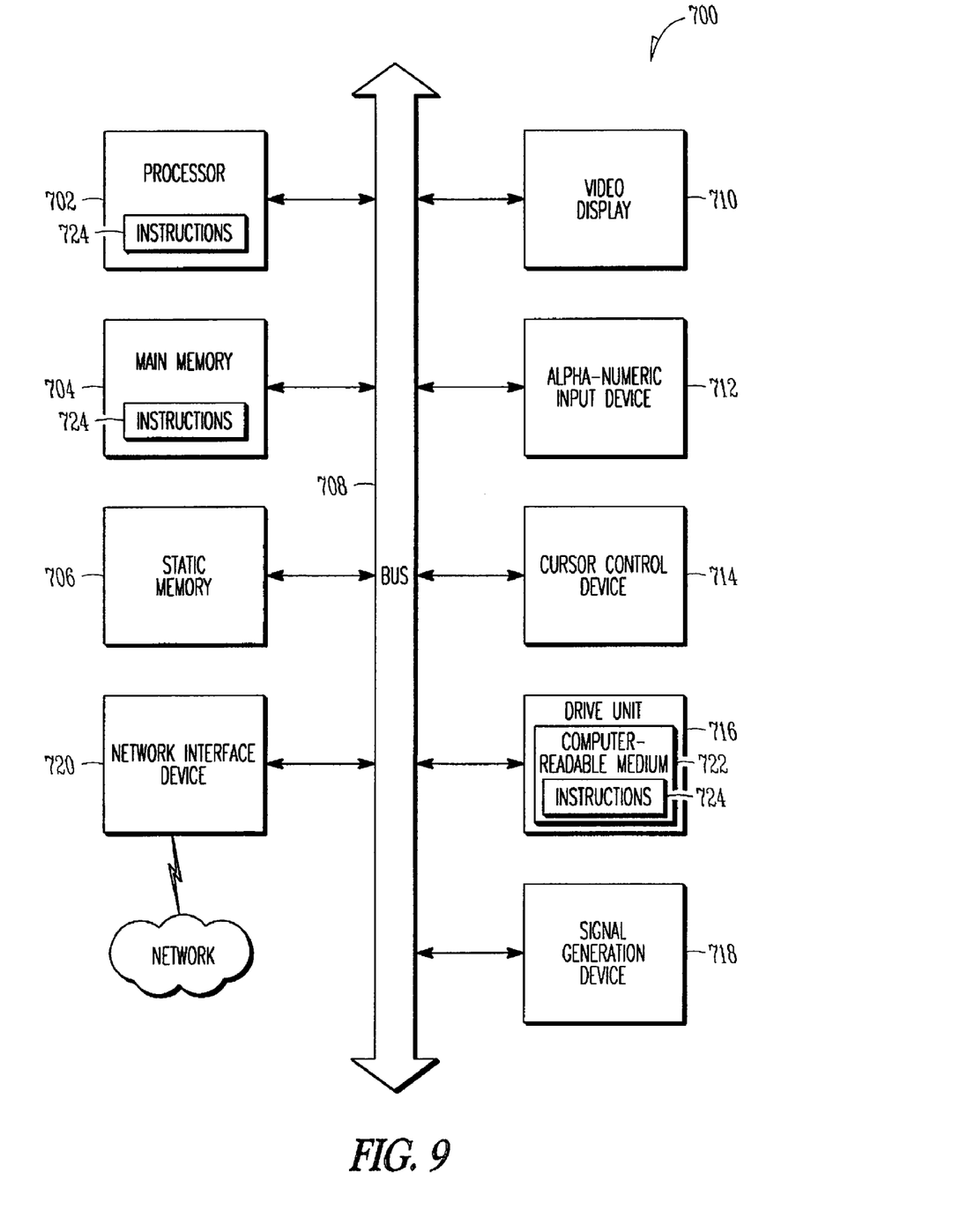
FIG. 9 shows a computer system as may be use to practice various embodiments of the invention.

FIG. 4 shows that the personality of each server 22.1-22.n is separated from the physical server(s) or infrastructure (see blocks 26 and 28 in FIG. 4). For example, the personality of the servers 22.1-22.n (e.g., the operating system (OS), application image(s), or the like) may be stored remotely from the physical infrastructure. For example, as shown in FIG. 3, storage or database(s) 30 may be provided to operate in conjunction with the servers 22.1-22.n. It will be appreciated that the database 30 may be a distributed data facility dispersed geographically. The database 30 may comprise a plurality of target memory devices 981.-98.n wherein each target memory device 98.1-98.n includes a plurality o logical units 99.1-99.n, as is shown in FIG. 9. In an example embodiment, the database 30 is connected to the switches 14, 16 via fiber channels 32, 34. Accordingly, each switch 14, 16 may include a fiber channel gateway 36. It will however be appreciated that in other embodiments, the switches 14, 16 may communicate with the databases 30 via other channels in addition to, or instead of, the fiber channel gateway.

The switch 14 is shown to communicate with a plurality of different networks (Local Area Networks, Wide Area Networks, or the like) via communication links 38, 40, 42. For example, the communication links 38, 40, 42 may be Ethernet connections and, accordingly, each switch 14, 16 may include one or more Ethernet gateways 44. In the example system 10, the communication link 38 is shown to connect to a network 46 interconnecting a plurality of hosts 48.1-48.5. The hosts 48.1-48.5 may form part of another data network, or be any other network host.

The switch 14 is also shown to communicate via a communication link 40 to a network 50 which may, for example, be an enterprise network. The network 50 is shown to communicate with desktop computers 52.1-52.2 and a subnet 54 which, in turn, is connected to desktop computers 56.1-56.3. Further, the switch 14 is also shown to connect via the communication link 42 to a network such as the Internet 58. It will however be appreciated that the aforementioned networks are merely example networks and different configurations and different numbers of networks and subnets may be provided that connect a wide range of network devices.

The system 10 may allow virtualization of servers that may be managed by a management module 60, which is shown, by way of example, to reside at the switch 14. It will, however, be appreciated that the management module 60 may reside in other components. The management module 60 communicates with a virtual server director 62 that controls the provisioning of the server pools 20.1-20.3. In an example embodiment, the virtual server director 62 communicates via a network 64 with the management module 60. The system 10 also includes a third party management module 65 that communicates with the management module 60 to manage the provisioning of virtual servers. In an example embodiment, the network 64 is an Ethernet network and, accordingly, the switch 14 may thus include one or more Ethernet ports 66. It will however be appreciated that the various communication links linking the various components/devices in the system 10 are not restricted to Infiniband connections, Ethernet connections, or the like. Any communication means may be provided to interconnect the various components.

Figure 5:
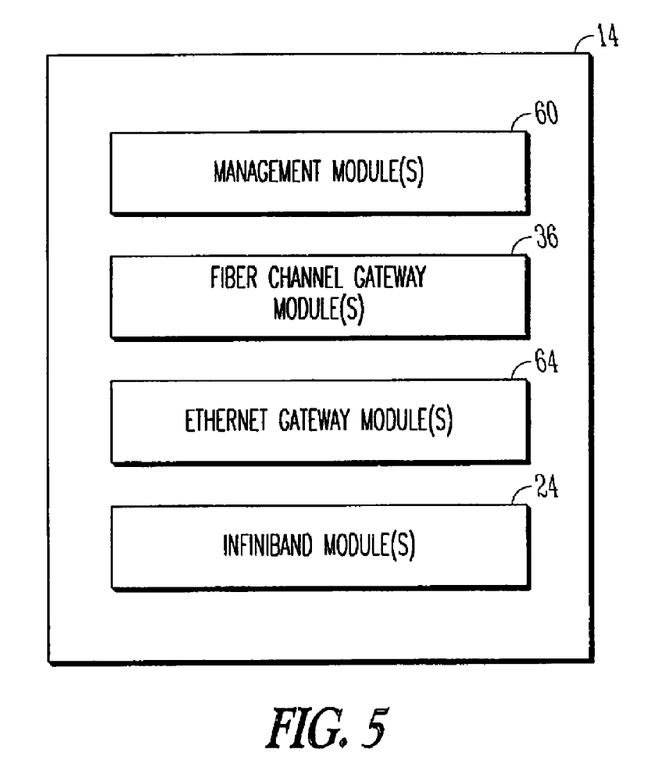
FIG. 5 shows a controller in the form of a switch, in accordance with an example embodiment of the invention.

Referring to FIG. 5, example modules of the switch 14 are shown. For example, the switch 14 is shown to include one or more management modules 60, one or more fiber channel gateway modules 36, one or more Ethernet gateway modules 44, and one or more Infiniband modules 24. It will be appreciated that the modules 60, 36, 44, and 24 may include various electronic components to effect communication using the relevant protocols. In an example embodiment, the virtual server director 62 of the system 10 allows software partners to program the switches 14, 16 with policies necessary to implement virtual servers on demand. For example, the third party management tool 65 may be used to accomplish this.

Figure 6:
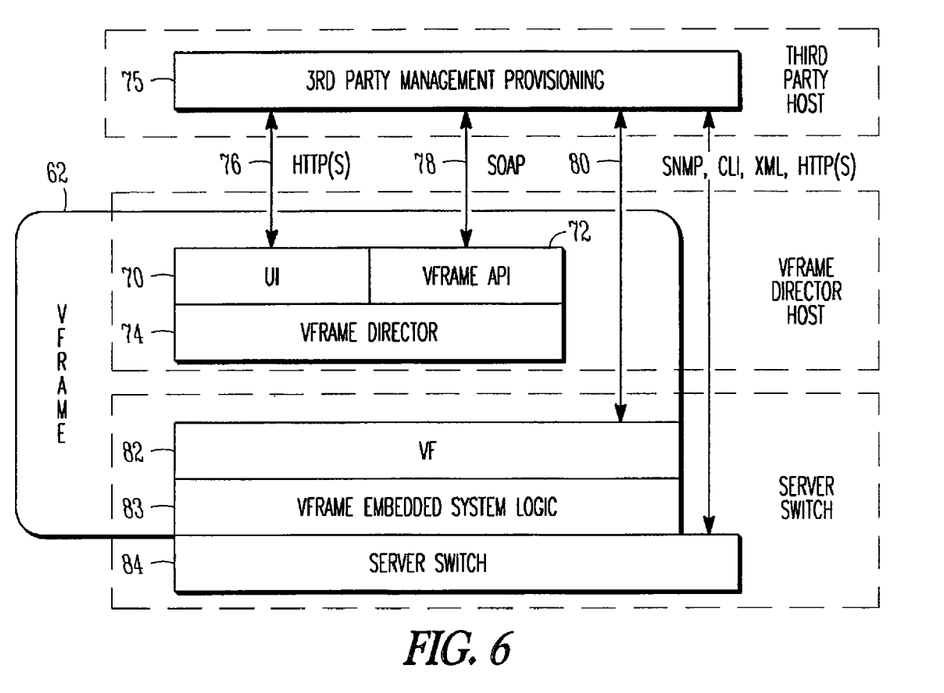
FIG. 6 shows example software architecture of a management module coupled to a third party management tool, consistent with an example embodiment of the invention.

As shown by way of example in FIG. 6, logically the virtual server (VFrame) director 62 (which may reside on a separate server) may include a user interface module 70, a virtual server director Application Program Interface (API) 72 and a virtual server director platform 74. The virtual server director 62 may communicate with the third party management tool application 75 (see third party management tool 65 in FIG. 3) via, for example, the network 64. In an example embodiment, the user interface module 70 communicates with the third party management and provisioning module 75 via an HTTP(s) link 76, a SOAP link 78, or the like. The third party management and provisioning application 75 is also shown to communicate via link 80 to a virtual frame platform 82. The server switch 14 is also shown to include embedded system logic 84 provided at a switch (e.g., the switches 14, 16).

Figure 7:
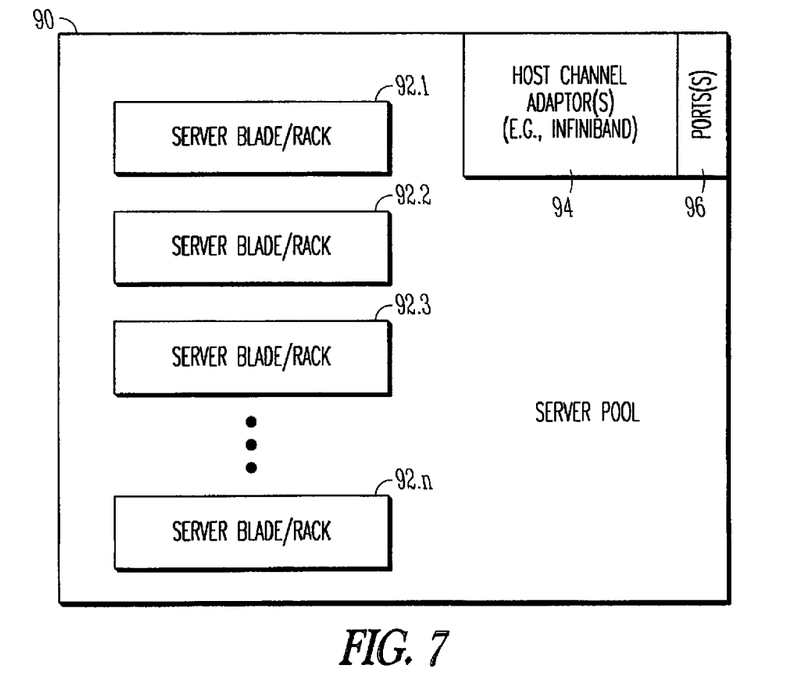
FIG. 7 shows a server pool as shown in FIG. 3, consistent with an example embodiment of the invention.

Referring to FIG. 7, reference 90 generally indicates an example server pool. The server pool 90 is shown to include a plurality of server blades or server racks 92.1-92.n. The server racks 92.1-92.n may correspond to the servers 22.1-22.n in FIG. 3. In an example embodiment, in order to communicate via the communication link 18, the server pool 90 includes a host channel adapter (HCA) 94 when deployed in an Infiniband environment. Further, one or more ports 96 may be provided for communication via further communication protocols or channels. As mentioned above, the servers 92.1-92.n are virtual servers. The virtual servers 92.1-92.n share computer resources and thus the server need not be a dedicated server and the entire computer need not be dedicated to running the server software. For example, one or more of the virtual servers 92.1-92.n may be virtual Web servers that provide low-cost web hosting services. Instead of requiring a separate computer for each server, a plurality of virtual servers can co-reside on the same computer. In most cases, performance is not affected and each web site may behave as if it is being served by a dedicated server.

In an example embodiment, the computer system 10 can boot from a fibre channel device, and a request for a well-known world wide port name can be identified and mapped to one of a number of target/LUN boot volumes depending on availability of the configured boot volumes.

Figure 8:
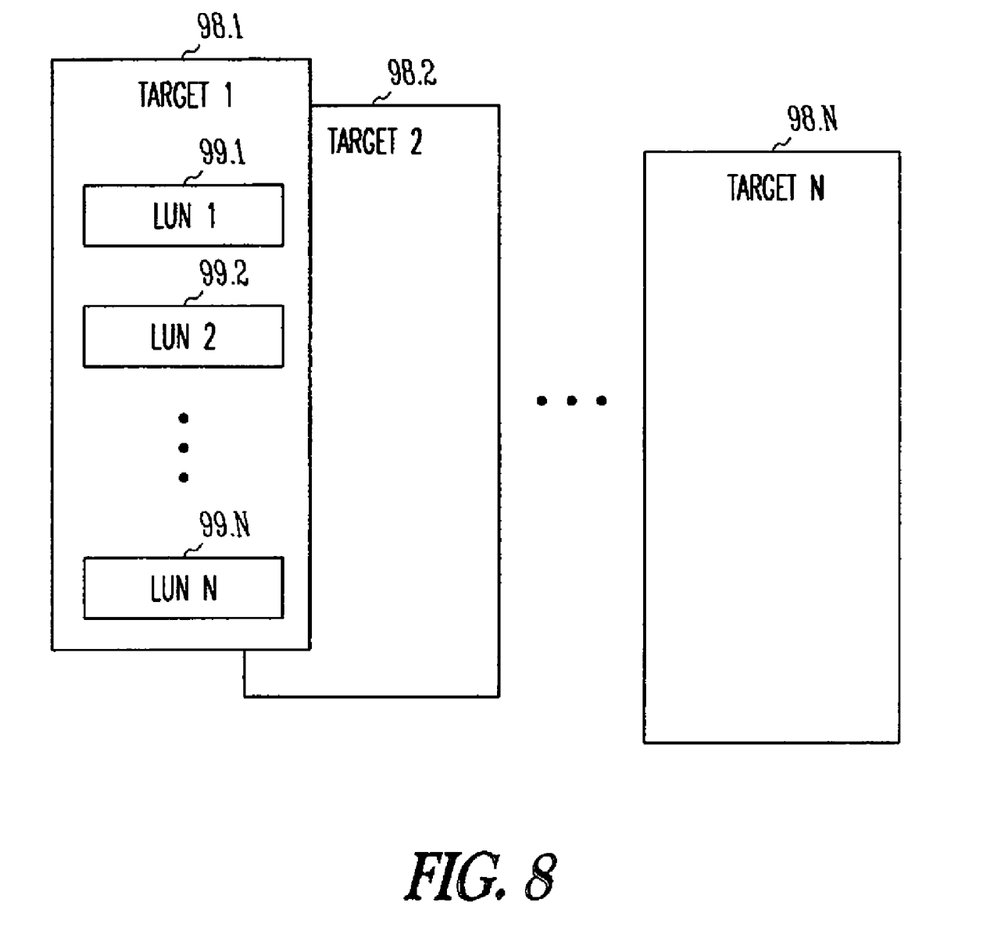
FIG. 8 shows logical units of the system of FIG. 3, consistent with an example embodiment of the invention.

FIG. 8 illustrates how a variety of target boot devices and logical units 98.1-98.n are arranged in one example. When a target boot volume initiator and service name are received in the controller 103, the controller looks up a corresponding fibre channel target and logical unit number (LUN). The target in some examples such as in fibre channel can include multiple disks, such as a disk array, where the LUN 99.1-99.n defines the actual disk within the target.

FIG. 9 shows a general purpose computer, as may be used to practice various embodiments of the invention. A bus 708 links a process 702 to memory 704 and 706, a video display 710, a keyboard 712 and mouse 714, a machine-readable medium such as a hard disk drive 716 that in various embodiments has software instructions or program data stored thereon, and a network interface 720. In operation, software instructions such as operating system and program information are loaded from novolatile storage such as hard disk drive 716 into memory 704, and are executed on processor 702. A user is able to control the computer via keyboard 712 and 714, and to receive feedback from the computer via video display 710.

The nonvolatile storage device 716 is used for only a portion of nonvolatile storage, such as storage of certain programs, or is eliminated altogether in some embodiments of the invention. In one such example, the computer system boots from a target device via the network interface 720, which is in a further example an InfiniBand link to a fibre channel nonvolatile storage device that is used to boot the computer system.

Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A data storage bridge system, comprising:
   an InfiniBand port to connect the data storage system to a computerized system;
   a fibre channel port to connect the data storage system to one or more fibre channel storage devices; and
   a controller to:
      receive an InfiniBand boot request from a computerized system via the InfiniBand Port, the InfiniBand boot request comprising an initiator including a global user identifier (GUID) to a target device identified by a Fibre Channel world wide port name (WWPN);
      look up at least one fibre channel target and logical unit number (LUN) corresponding to the initiator from among a plurality of LUNs; and
      map the InfiniBand boot request to the at least one looked up fibre channel LUN, such that data is communicated between the at least one fibre channel LUN and the controller and between the controller and the computerized system such that the computerized system is to boot from the at least one fibre channel LUN.

2. The data storage bridge system of claim 1, the data communicated between the controller and the computerized system communicated using the SCSI RDMA protocol.

3. The data storage bridge system of claim 1, wherein the world wide port name (WWPN) used to look up fibre channel target and LUN comprises a well-known port name identifying a boot service.

4. The data storage bridge system of claim 1, wherein the mapped target and LUN comprise two or more LUNs such that if a first LUN is unavailable the computer system is to boot over a subsequent mapped LUN.

5. A method of booting a system via a data storage bridge system, comprising:
   receiving an InfiniBand boot request from a computerized system via an InfiniBand Port, the InfiniBand boot request comprising an initiator including a global user identifier (GUID) to a target device identified by a Fibre Channel world wide port name (WWPN);
   looking up at least one fibre channel target and logical unit number (LUN) corresponding to the initiator from among a plurality of LUNs; and
   mapping the InfiniBand boot request to the at least one looked up fibre channel LUN, such that data is communicated between the at least one fibre channel LUN and a controller and between the controller and the computerized system such that the computerized system is to boot from the at least one fibre channel LUN.

6. The method of booting a system via a data storage bridge system of claim 5, the data communicated between the controller and the computerized system communicated using the SCSI RDMA protocol.

7. The method of booting a system via a data storage bridge system of claim 5, wherein the world wide port name (WWPN) used to look up fibre channel target and LUN comprises a well-known port name identifying a boot service.

8. The method of booting a system via a data storage bridge system of claim 5, wherein the mapped target and LUN comprise two or more LUNs such that if a first LUN is unavailable the computer system is to boot over a subsequent mapped LUN.

9. A non-transitory machine readable medium with instructions stored thereon, the instructions when executed to:

receive an InfiniBand boot request from a computerized system via an InfiniBand Port, the InfiniBand boot request comprising an initiator including a global user identifier (GUID) to a target device identified by a Fibre Channel world wide port name (WWPN);

look up at least one fibre channel target and logical unit number (LUN) corresponding to the initiator from among a plurality of LUNs; and map the InfiniBand boot request to the at least one looked up fibre channel LUN, such that data is communicated between the at least one fibre channel LUN and a controller and between the controller and the computerized system such that the computerized system is to boot from the at least one fibre channel LUN.

10. The non-transitory machine readable medium of claim 9, the data communicated between the controller and the computerized system communicated using the SCSI RDMA protocol.

11. The non-transitory machine readable medium of claim 9, wherein the world wide port name (WWPN) used to look up fibre channel target and LUN comprises a well-known port name identifying a boot service.

12. The non-transitory machine readable medium of claim 9, wherein the mapped target and LUN comprise two or more LUNs such that if a first LUN is unavailable the computer system is to boot over a subsequent mapped LUN.

* * * * *